United States Patent [19] [11] 4,185,431
Brownlee [45] Jan. 29, 1980

[54] FACED BUILDING UNIT

[76] Inventor: Robert O. Brownlee, 353 McDonald Ave., Mobile, Ala. 36604

[21] Appl. No.: 850,373

[22] Filed: Nov. 10, 1977

[51] Int. Cl.² ............................ E04C 2/24; C08K 3/00; B28B 1/16
[52] U.S. Cl. .................................. 52/309.17; 52/612; 260/42.13; 264/256
[58] Field of Search ............................ 52/309.17, 612; 260/42.13; 264/256

[56] References Cited

U.S. PATENT DOCUMENTS

| 1,650,695 | 11/1927 | Daley | 52/612 X |
|---|---|---|---|
| 2,760,885 | 8/1956 | Larsen | 428/451 |
| 3,194,724 | 7/1965 | Sergovic | 52/309.17 X |
| 3,239,479 | 3/1966 | Roenicke et al. | 52/309.17 X |
| 3,850,651 | 11/1974 | Duncan et al. | 106/90 |
| 4,088,804 | 5/1978 | Cornwell et al. | 264/256 X |
| 4,151,145 | 4/1979 | Emig et al. | 260/42.13 X |

FOREIGN PATENT DOCUMENTS

| 1509207 | 12/1968 | Fed. Rep. of Germany | 52/309.17 |
|---|---|---|---|
| 2164256 | 6/1973 | Fed. Rep. of Germany | 52/309.17 |
| 753528 | 7/1956 | United Kingdom | 52/309.17 |
| 866004 | 4/1961 | United Kingdom | 264/256 |

Primary Examiner—Alfred C. Perham
Attorney, Agent, or Firm—Donald B. Tobin

[57] ABSTRACT

A cementitious facing material for bonding to either preformed masonry building units or to existing masonry and concrete walls, floors or slabs; comprising a suitable proportioned dry mixture of (1) white Portland cement, (2) washed and screened sand of glass making quality, and (3) paint pigments. These thoroughly mixed dry materials are activated into a moist colored concrete mixture of troweling consistency by the addition of a wetting agent in the correct proportions of water and polyvinyl acetate resin emulsion (containing approximately 50% of solids). The proportions of water and resin in the wetting agent to be based upon the desired percentage of resin to be retained in the facing material after it has been cured. A coating of bonding material is applied to the face of the preformed masonry unit or to the existing masonry or concrete wall, floor or slab and the facing is applied over the bonding material and bonded to the existing base. The composition, when applied as a facing and allowed to cure, forms a water-resistant, wear resistant, resilient, tough, uniformly colored facing having the appearance of fine grained concrete.

9 Claims, 2 Drawing Figures

4,185,431

FACED BUILDING UNIT

BACKGROUND OF THE INVENTION

The present invention relates to a cementitious facing composition for bonding to a base material, and more particularly, to a facing composition using an aqueous emulsion of a polymer bonding agent as a wetting agent.

There is often a need to apply a facing to a base material, for instance, individual bricks or concrete blocks, or existing masonry and concrete walls, floors and slabs or the like or gypsum board in order to give a finished appearance to the base material. It is desirable to have a facing which has the appearance of fine grained concrete and provides a water-resistant, wear-resistant, resilient, tough and uniformly colored surface which will maintain its appearance with minimum maintenance. It has been a recurring problem to find a facing material which would economically fulfill all of these requirements and could be easily made and applied in the field.

In the past, many base materials have simply been coated with various mixtures of Portland cement and sand or just Portland cement to accomplish this end. This is commonly done for structures made of brick or concrete block. Whether this coating is applied directly to the brick or block before assembly or to the assembled structure, the facing has many disadvantages. It is usually not water-resistant so that some separate waterproofing composition like paint or sealer must be applied. Such facings are also usually brittle so that they may be damaged when hit. If individual blocks are faced before assembly, the facing can easily be chipped off the block during shipping or handling.

In those applications where it is important to have a surface which will resist damage from impacts, various kinds of plastic coatings have been used for the individual building bricks or blocks or the assembled structure. These materials have the disadvantage of being difficult to maintain, especially when it is desired to provide a uniform and long lasting color to the facing.

Obtaining a satisfactory bond between the facing and base material has also been a recurring problem. In order to overcome the problems of bonding the facing to the base material, it has been suggested to use bonding agents directly between the facing and the base such as the reemulsifying, polyvinyl acetate adhesive composition disclosed in U.S. Pat. No. 2,760,885 to Larsen. Although these types of bonding agents provide an improved bond between the facing and the base material, the facing itself remains brittle, water absorbent and weather sensitive.

To overcome some of the disadvantages of cementitious facing, in some applications, individual pieces of hard weather and water resistant material such as ceramic tile have been bonded to the base material. Although such tile is water-proof and retains its appearance, maintaining the tile bonded to the base material is difficult and the tiles themselves are brittle.

There is a particularly difficult problem of providing a proper coating to a concrete slab such as would be used for a floor, sidewalk, driveway or patio. Such slabs are conventionally made with a substrate composed of cement, light aggregate like sand and heavy aggregate like stone and a surface composed of cement and light aggregate sand. Because such slabs are exposed to a wide range of weather conditions and sometimes very heavy loading, it is difficult to maintain the surface intact. The surface is also easily discolored because it is porous.

Concrete floors, such as those used in many industrial environments, are noted for being uncomfortable to stand or walk on for long periods of time. People who must walk on hard concrete floors soon develop pains and aches in their legs and feet muscles and joints. Carpeting or wooden flooring or various kinds of cushioned tile have been used over the concrete to provide cushioning. Although carpet, wood or tile floors can be beautiful, they are expensive to install and clean. Providing cushioning in the surface layer of a concrete floor would provide the cushioning of more expensive floors and still maintain the durability, appearance and easy cleaning of concrete.

In the past, various ingredients have been used as additives to concrete as, for example, strengtheners or as setting accelerators or retardants. A variety of vinyl polymers have been used to strengthen concrete and to improve its resistance to chemicals. See for example U.S. Pat. No. 3,850,651 where vinyl polymers or copolymers have been incorporated into cement compositions and cured at elevated temperatures.

Even in view of all the work that has been done with cement, there is still a need for a facing composition that can be used to cover a variety of base materials and provide a pleasing appearance which is water-resistant, wear-resistant, resilient, tough, uniformly colored and relatively maintenance free. It is also desirable that such a facing material have the versatility to be applied either directly to individual brick or block or to the assembled masonry or concrete walls, floor or slab as a whole.

SUMMARY OF THE INVENTION

The present invention provides a facing material which has the desirable appearance of fine grain cement and at the same time is water-resistant, wear-resistant, resilient, tough, easy to maintain, and may be firmly applied to the individual brick or block or to the assembled structure.

The present facing composition may be used over a variety of base materials used for building structures, e.g., individual bricks or concrete blocks, or existing masonry and concrete walls, floors and slabs or gypsum board. The facing composition comprises a suitably proportioned dry mixture of cement, light aggregate and, if desired a coloring agent. The wetting agent which is used to set and harden the concrete is an aqueous emulsion of polyvinyl acetate (containing 50–65% solids) or some similar polymer agent of one part by volume of polyvinyl acetate and about three to one third parts by volume of water. The proportions of the water and resin in the wetting agent is chosen to provide a desired percentage of resin retained in the facing composition after it cures. The wetting agent is mixed with the cement, aggregate and coloring agent in sufficient amounts to provide a mixture of troweling consistency. Before the facing composition is applied to the base material, a bonding agent may be applied over the base material. The facing is then applied over the bonding material and bonded to the base material. The composition, when applied as a facing and allowed to dry, forms a water-resistant, wear-resistant, resilient, tough, uniformly colored facing having a concrete appearance which is easy to maintain and inexpensive to make and apply.

Individual concrete blocks faced with a composition of the present invention easily withstand the regular rigors of handling and shipping. Such individual blocks may be readily constructed in an assembly-line fashion. Concrete blocks may be placed in a form made of metal, wood or plastic or some other suitable material. The bottom and top of the form are open. The form may be provided in several parts and bolted or clamped snugly around the blocks. The block fits snugly into the form and is recessed below the upper edges of the form an amount equal to the desired thickness of the facing, preferably, about ¼ inch. The form is coated with a non-adhesive composition like wax or vegetable oil.

The surface of the block to which the facing composition is to be applied may be wet with water or coated with a polymer bonding agent. The facing composition is then applied by means of a trowel to the exposed surface of the block and finished off even with the protruding edges of the form.

The consistency of the facing composition is adjusted so that the form may be immediately removed from the block. The block is then cured for a period of approximately four weeks. As the facing composition cures, the polyvinyl acetate crystalizes and is deposited substantially uniformly throughout the facing composition.

Building blocks faced with the kind of composition of this invention have been able to withstand temperatures from well below freezing to approximately 250° F. If the corner of a block is chipped off across the facing-block interface, the block and the facing will break together and the bond between the facing and the block will not be weakened. Tests have shown that the facing composition is able to withstand substantial impact loads.

The present invention is useful as a coating for an individual brick or block or for an entire surface of a masonry or concrete wall, floor or slab to provide a water-resistant, wear-resistant, resilient, tough, and uniformly colored facing having the appearance of fine grained concrete.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
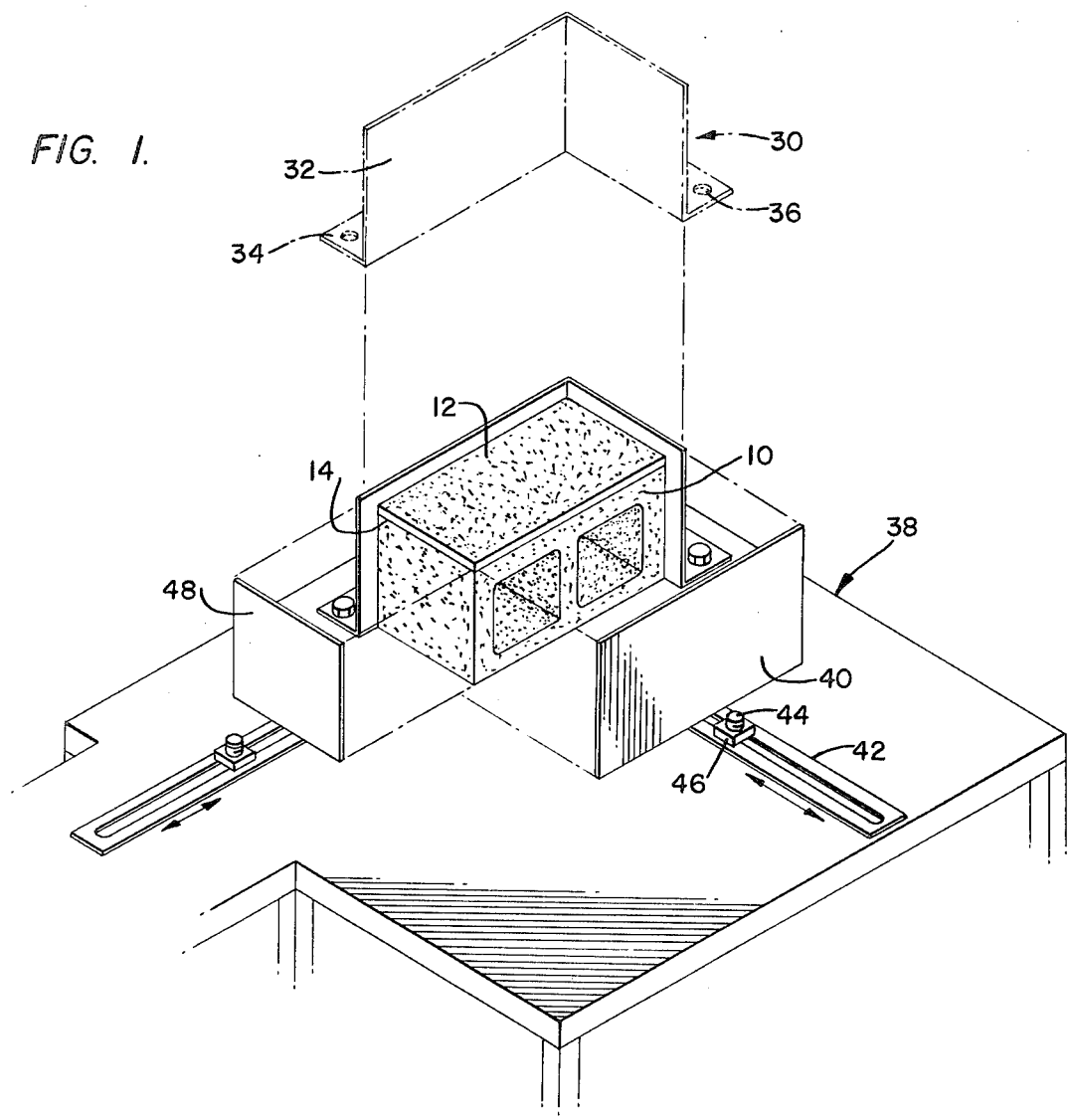
FIG. 1 is a perspective view of a concrete building block with the facing composition of the present invention bonded to it, and showing an exploded view of a form used to place the facing on the block.

Referring now to FIG. 1 there is shown a perspective view of the faced building element of the present invention including a conventional concrete building block 10 to which a facing composition 12 is bonded by bonding material 14. The building block is typically made of concrete but may also be brick or any other conventional material for making masonry building units. The bonding agent may be an aqueous emulsion of polyvinyl acetate. Many such agents are commercially available. The bonding agent is applied by means of a spray or a brush to a face of block 10. The facing composition 12 is then applied in a desired thickness preferably about ¼" over bonding agent 14 by means of a trowel or the like.

The facing is then allowed to cure and harden for a period of up to four weeks to form faced building element having a wear-resistant, waterproof, weather-resistant, tough surface.

Figure 2:
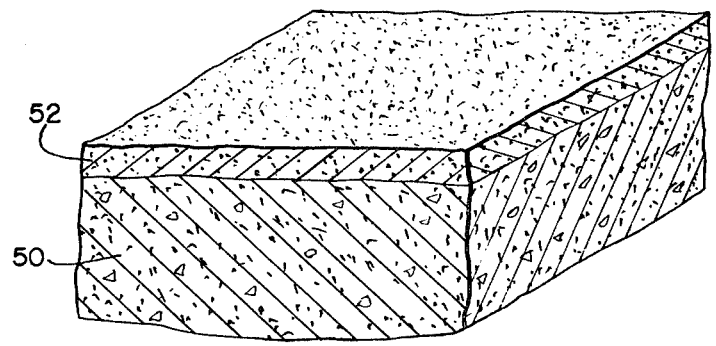
FIG. 2 is a cross-sectional view of a portion of a concrete slab coated with the facing composition of the present invention.

Referring now to FIG. 2, the facing composition 52 may be applied to a structure such as a floor 50, wall or slab made of a number of such blocks, bricks or made of heavy aggregate concrete. Approximately a ½" coating 50 for a concrete floor 52 or slab provides a resilient walking surface which is comfortable to use, attractive in appearance and easy to maintain. A suitable coloring agent can be used to give the floor a uniform color which is distributed throughout the thickness of the coating so that it will not wear away during use.

Referring again to FIG. 1, a form 30 is used when applying the facing composition to an individual block. Form 30 may include an L-shaped piece 32 with a surrounding flange 34 having a number of holes 36 for use in securing piece 32 to a working surface 38. Side form piece 40 is supported perpendicular to work surface 38 by a slotted member 42 which is slidably mounted on bolt 44 projecting from work surface 38. Side form piece 40 is held in place against block 10 when speed nut 46 is tightened down onto bolt 44. End form piece 48 is slidably mounted on work surface 38 in the same manner as side form piece 40. Form 32 is bolted to work surface 38, block 10 is placed against form 32. Form 32 projects beyond the edges of block 10 and above the top face of block 10. Form pieces 40 and 48 are then slid tightly against the exposed sides of block 10. Forms 40 and 48 project above the top of the face of block 10, the same distance as form 32 but their surface areas are the same as the confronting surface areas of block 10. This form provides a fast and easy way to apply the facing composition to a building block. When the composition is applied, it should have the consistency of soft putty so that the faced block can be immediately removed from the form. Curing of the facing composition of the present invention can begin immediately after application without the need of a supporting form.

The facing composition is compounded by mixing about 2 parts by volume of dry light aggregate with about 1 part by volume of dry Portland cement. The light aggregate is preferably washed sand of glass making quality having a grain size small enough to pass through a 20 mesh screen. If desired, dry paint pigments may be added to color the facing composition. The dry pigment is mixed together with the sand and cement. If a coloring agent is used it is preferable to use white Portland cement so that the color will not be affected by the normally grey Portland cement. This dry mixture of sand, cement and coloring agent is thoroughly mixed to distribute the cement and coloring agent substantially uniformly throughout the mix.

After the dry sand, cement and coloring agent have been mixed, the next step is to prepare a wetting agent. The wetting agent used in the present invention is compounded of one part by volume of commercially available aqueous emulsion of polyvinyl acetate containing about 50 to 65 percent solids and water in the range of preferably about ⅛ to three parts by volume and most preferably in the range of about 1 to ⅓ parts by volume. The amount of water is based upon the desired consistency of the wet facing compound. The amount of resin is based upon the desired percentage of resin solids remaining in the final product and the requirement that the wetting-agent be fluid enough to wet and activate each particle of Portland cement contained in the dry mixture. The aqueous emulsion of polyvinyl acetate used in the wetting agent may be the same material that is used as bonding agent 14 or any cementing composition incorporating polymers or copolymers derived from polymerizable vinyl compounds. This wetting agent is then mixed with the dry mixture of sand, cement and coloring agent in sufficient amounts to form a medium consistency facing composition having the consistency of soft putty. The wetting agent should be thoroughly mixed so that the polymer emulsion will be substantially uniformly distributed throughout the mixture. This wetting agent activates the cement in the mixture to set the concrete. The polyvinyl acetate resin solids are distributed throughout the set concrete.

Facing composition 12 is then applied over the bonding agent 14 on block 10. Because the facing composition has the consistency of soft putty it will not run off the block even while it is wet. The faced building element may therefore immediately be moved to a curing area even while the facing composition is wet. It is allowed to cure for a period of up to four weeks to form a faced building element made entirely of concrete. If desired, conventional additives may be included in the facing composition to accelerate curing time.

The faced building element of the present invention has the desirable appearance of concrete and the toughness of plastic coated units. It is not brittle but is resistant to impact loading. It has the advantage of being water-resistant, wear-resistant, resilient and tough so that it may be easily and economically maintained. If it requires cleaning, it may be cleaned with harsh acids and even abrasive sand blasting without detracting from its color, or damaging its water-resistance or other properties. Since the coloring agent is distributed throughout the facing, the original color will be maintained even if the surface layer is removed by sand blasting or wear.

The benefits obtained by the faced building element of the present invention are illustrated in the following examples, which are descriptive of, but not limiting upon the invention.

EXAMPLE 1

A conventional concrete building block measuring 4"×8"×16" was faced with ¼" of the facing composition described herein using as a wetting agent an aqueous emulsion of polyvinyl acetate having about 12½% solids. This was obtained by mixing 1 part resin (having 50% solids) with 3 parts water. The wetting agent was combined with a dry mixture of 2 parts by volume washed sand of glass making quality screened through a 20 mesh screen and 1 part by volume white Portland cement. The wetting agent was used in sufficient quantity to obtain a concrete having the consistency of soft putty. The facing composition was applied to the concrete block and allowed to set and cure for four weeks. The resulting facing composition had a percent of retained solid resin of approximately 1.96%. The resulting faced concrete block was then tested. The block was frozen and thawed several times with no ill effects. It was then heated in an oven at 250° F. for a period of two and one-half hours with no ill effects. The block did not develop any change in outer appearance, no tending of the facing from the body of the block was evident. On a different block faced with the same facing composition further tests were run. To test resistance to penetration the face was subjected to a vertical pressure of 300 pounds for five seconds using a 5/64" diameter steel rod. A penetration of 3/64 of an inch was noted, the surface compressed slightly, some elasticity and no brittleness was indicated. The face of the block was tested for resistance to breakage by subjecting the surface to a blow of a 14 pound steel ball dropped vertically through air from a given height. At 9 inch height there was no damage. At 12 inch height the block and facing break. The break was along a common line so the block and facing broke together. The facing did not separate from the block. The ball was dropped on the center of the web of the concrete block.

EXAMPLE 2

A block like that of Example 1 was faced with a facing composition like that of Example 1 except that the wetting agent had 25% (1 part resin having 50% solids and 1 part water) resin solids and the resulting facing had 3.84% resin solid. The same penetration test was run and a penetration of 7/64 of an inch was noted, the surface compressed slightly, some elasticity and no brittleness was indicated. The same resistance to breakage test was run and the 14 pound steel ball dropped from a height of 9" produced a small dent, from 12" produced ½" diameter dent, from 15" cracked the block partway, from 18" broke the block. As with Example 1 the break was along a common line and the block and facing broke together. The facing did not separate from the block.

EXAMPLE 3

A block like that of Example 1 was faced with a facing composition like that of Example 1 except that the wetting agent had 37½% resin solids (3 parts resin having 50% solids and 1 part water) and the resulting facing had 5.66% retained resin solids. The same penetration test was run and a penetration of ⅛" was noted, the surface compressed slightly, some elasticity and no brittleness was noted. The same resistance to breakage test was run and the 14 pound steel ball dropped from 12" produced a small dent, from 15" produced a ¾" diameter dent, from 18" a 1" diameter dent, from 21" a 1¾" dent with a small crack and from 24" broke the block. As with Example 1, the break was along a common line and the block and facing cracked together. The facing did not separate from the block.

EXAMPLE 4

A block like that of Example 1 was faced with a facing composition like that of Example 1 except that the wetting agent contained zero % resin solids. The same penetration test was run and a penetration of 1/128 of an inch was noted, the face chipped slightly and appeared brittle. The same resistance to breakage test was run and the 14 pound steel ball dropped from 9" produced no damage and from 12" broke the block and the facing.

It will be appreciated that a concrete block faced with the facing composition of the present invention having a percentage of retained solids of about 5.66%, is not only stronger but is resistant to impact loading.

While the invention has been illustrated and described in certain embodiments, it is recognized that variations and changes may be made therein without departing from the invention set forth in the claims.

What is claim is:

1. A cementitious facing composition for a building material comprising:

about twenty-five (25) parts by volume of a dry mixture in proportions of about 100 parts of portland cement and 200 parts of light aggregate;

about four (4) parts by volume aqueous wetting agent to provide a composition having the consistency of soft putty when mixed with said mixture of cement and light aggregate, said wetting agent including an aqueous emulsion of 12.5 percent to 37.5 percent by volume of polymer resin solids derived from polymerizable vinyl compounds; said composition when applied as a coating and allowed to dry yielding a water-resistant, wear-resistant, tough and resilient facing having the appearance of cement, and having in the range of 1.96 to 5.66 percent by volume of resin solids retained in the cured composition.

2. The composition according to claim 1 wherein said mixture comprises one part by volume dry white Portland cement, two parts by volume light aggregate and wherein the light aggregate is glass making quality sand sifted through a twenty mesh screen.

3. The composition according to claim 1 wherein said polymer is polyvinyl acetate including from 50 to 65 percent solids.

4. The composition of claim 1 further including a dry coloring agent mixed with said cement and light aggregate and substantially uniformly distributed therein to provide a substantially uniform color throughout said composition, said composition, when applied as a coating and allowed to dry, yielding a colored coating which may be cleaned by acid or abrasion without loosing its original color.

5. A building unit comprising:
a concrete block;
an adhesive coating applied over a surface of said concrete block;
a facing composition applied over said coated surface having about twenty-five (25) parts by volume of a dry mixture in proportions of:
one part by volume portland cement; and two parts by volume of sand;
about four (4) parts by volume aqueous wetting agent to provide a composition having the consistency of putty when mixed with said cement and said sand, said wetting agent including:
an aqueous emulsion of 12.5 percent to 37.5 percent by volume of polymer resin solids derived from polymerizable vinyl compounds;
said composition, when cured, having in the range of 1.96 to 5.66 percent by volume of resin solids retained therein.

6. The building unit of claim 5 wherein said adhesive coating includes an aqueous emulsion of polyvinyl acetate having 50 to 65 percent solids.

7. The building unit of claim 5 wherein said polymer is polyvinyl acetate including from 50 to 65 percent solids.

8. A method of making a concrete block having a cementitious facing composition comprising the steps of:
coating an open form with a non-adhesive composition;
surrounding a concrete building block with the open form so as to leave an exterior surface of said block exposed, said form having an upstanding lip surrounding said block of a height equal to the thickness of said facing;
coating said exterior surface with an adhesive; preparing a cementitious facing composition by mixing about twenty-five (25) parts by volume of a dry mixture including:
one part by volume dry cement and,
two parts by volume dry sand;
preparing about four (4) parts by volume aqueous wetting agent for said dry mixture including 12.5 percent to 37.5 percent by volume polyvinyl acetate solids
mixing said dry mixture of cement and sand with said wetting agent, and to leave in the range of 1.96 to 5.66 percent by volume polyvinyl acetate resin solids in the cured facing composition;
applying said wet cementitious facing composition over said adhesive;
removing said form from said block;
allowing said facing composition to cure and dry to form a concrete block with its own cementitious facing.

9. The method according to claim 8 wherein the method is carried out at room temperature.

* * * * *